US006920852B2

(12) United States Patent
Machida

(10) Patent No.: US 6,920,852 B2
(45) Date of Patent: Jul. 26, 2005

(54) APPARATUS AND METHOD FOR CONTROLLING ENGINE VALVE OPENING IN INTERNAL COMBUSTION ENGINE

(75) Inventor: Kenichi Machida, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/874,201

(22) Filed: Jun. 24, 2004

(65) Prior Publication Data

US 2005/0022762 A1 Feb. 3, 2005

(30) Foreign Application Priority Data

Jun. 26, 2003 (JP) ........................................ 2003-182784

(51) Int. Cl.[7] ................................................ F01L 1/34
(52) U.S. Cl. ................................ 123/90.16; 123/90.15; 123/90.17; 701/105
(58) Field of Search .......................... 123/90.16, 90.15, 123/90.17; 701/105

(56) References Cited

U.S. PATENT DOCUMENTS 5,363,817 A * 11/1994 Ikeda et al. ............... 123/90.15
5,664,529 A * 9/1997 Kato et al. ................ 123/90.15
5,715,779 A * 2/1998 Kato et al. ................ 123/90.15
6,301,543 B2 * 10/2001 Fujiwara et al. ............ 701/114
6,776,130 B2 * 8/2004 Miyakoshi et al. ....... 123/90.15

FOREIGN PATENT DOCUMENTS

JP         04350347 A  * 12/1992  .......... F02D/45/00
JP      2000-41955 A    2/2003

* cited by examiner

Primary Examiner—Thomas Denion
Assistant Examiner—Kyle M. Riddle
(74) Attorney, Agent, or Firm—Foley & Lardner LLP

(57) ABSTRACT

The present invention is constructed such that there is provided a variable valve opening mechanism which varies an opening of an engine valve continuously, the opening of the engine valve is feedback controlled to a target opening and at the same time, at least the opening of the engine valve relative to controlled variable of a first reference opening is detected to be learned at an initial time, and after the initial learning, the opening of the engine valve relative to controlled variable of a second reference opening different from the first reference opening is detected to be learned, and based on the initial learning result and a newest learning result of the second reference opening, an opening detection characteristic of an opening sensor is learned.

25 Claims, 15 Drawing Sheets

APPARATUS AND METHOD FOR CONTROLLING ENGINE VALVE OPENING IN INTERNAL COMBUSTION ENGINE

FIELD OF THE INVENTION

The present invention relates to a technology for learning a valve opening detection characteristic of an opening sensor to maintain a satisfactory control, in an apparatus for variably controlling an opening (a lift amount, an operating angle) of an engine valve (an intake valve or an exhaust valve) of an internal combustion engine, while detecting the opening by the opening sensor.

RELATED ART OF THE INVENTION

There has been known a so-called non-throttle control in which, in an internal combustion engine equipped with a variable valve opening mechanism which varies an opening of an engine valve continuously, for example, an opening of an intake valve is controlled to a target opening while being detected by an opening sensor (a lift amount sensor).

A potentiometer or the like is used as the opening sensor. However, due to mechanical and electrical variations of the sensors, variations are exhibited in correlation (valve opening detection characteristic) between a sensor output and an actual opening, and further, a valve opening detection characteristic is changed by the deterioration with time. Therefore, the accuracy of engine valve opening control based on the sensor output is sometimes lowered. Japanese Unexamined Patent Publication No. 2003-41955 has proposed that a minimum opening and a maximum opening of the engine valve at the time when the engine valve is abutted on a stopper restricting an operation range of the variable valve opening mechanism, are detected to be learned, so that the valve opening detection characteristic is learned so as to be maintained constant, thereby maintaining the valve opening control satisfactorily.

When the above learning is performed, since an influence of detection error is large in a region where the opening of engine valve is small, it is preferable to learn at least the minimum opening. However, if the valve opening is controlled to the minimum opening during an engine operation, since an air amount is too reduced (especially in the case where the variable valve opening mechanism is used together with a variable valve timing mechanism, the air amount may become insufficient depending on the setting of valve timing), there is a possibility of engine stall and therefore, a learning opportunity cannot be obtained. Also, it can be considered that the learning is performed after the self-shutting off. However, in the variable valve opening mechanism using ball screws and the like, a driving force is hardly to be ensured and accordingly, in many cases, it is hard mechanically to control the valve opening to the minimum opening.

Further, in the types of opening sensors, there are the one having a large tendency in which an output value to the actual opening is offset by a fixed amount over the entire opening region due to the deterioration and the one having a large tendency in which an inclination of a change in output value to a change in actual opening is offset. In particular, in the latter sensor, since a change in maximum opening relates to a change in characteristic after the deterioration, it is impossible to perform the satisfactory learning of the valve opening characteristic only by learning the minimum opening.

SUMMARY OF THE INVENTION

It is therefore an object of the present invention to make it possible to always perform a high accurate control of an engine valve opening while performing the learning for correcting a change in valve opening detection characteristic due to the deterioration of an opening sensor which detects the engine valve opening.

In order to accomplish the above object, the present invention is constructed so that at least an opening of an engine valve relative to controlled variable of a first reference opening is detected to be learned at an initial time, and thereafter, the opening of the engine valve relative to controlled variable of a second reference opening which is large is detected to be learned, and a valve opening detection characteristic is learned based on the initial learning result and a newest learning result of a predetermined opening.

The other objects and features of the invention will become understood from the following description with reference to the accompanying drawings.

DESCRIPTION OF THE PREFERRED EMBODIMENT

Figure 1:
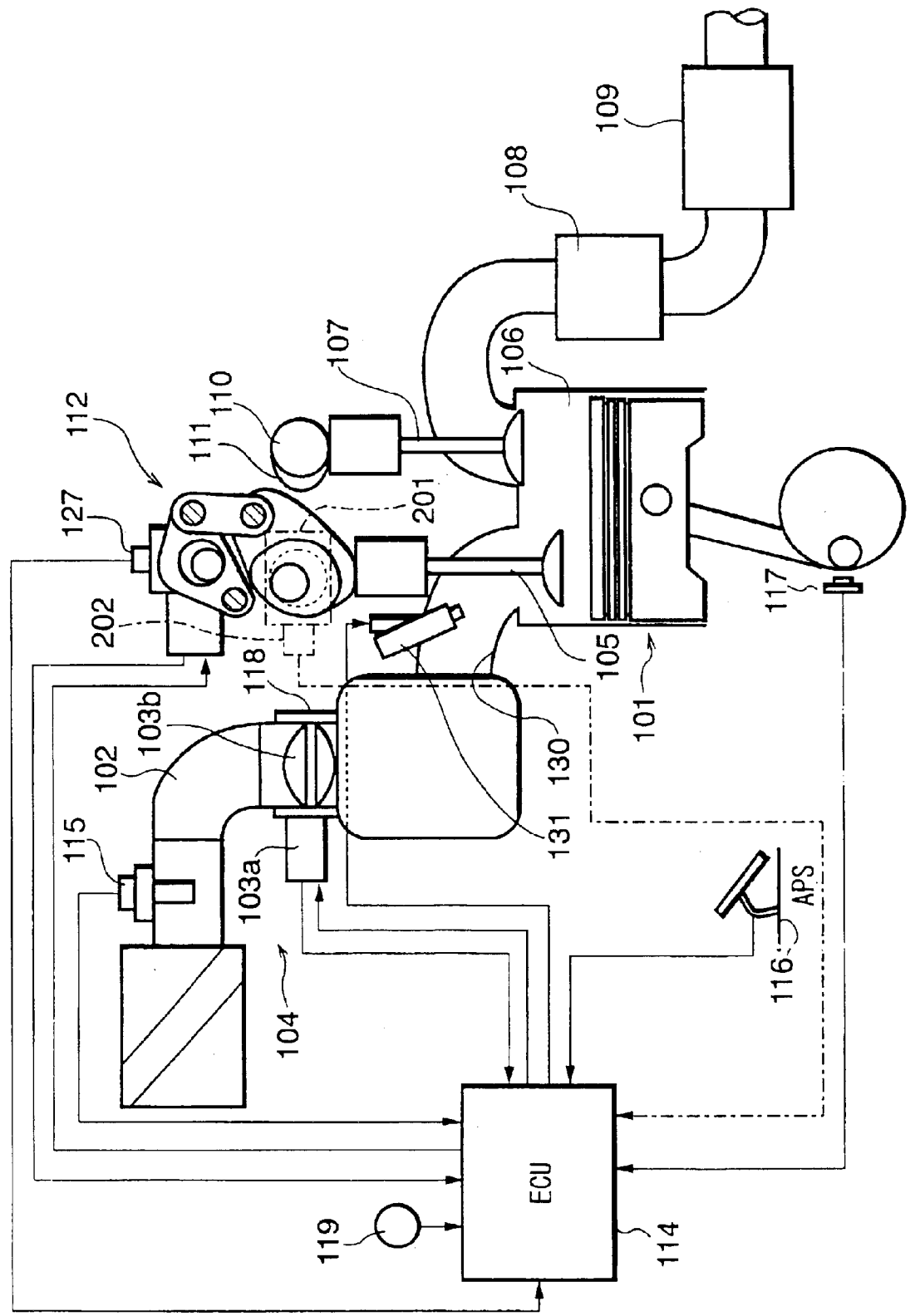
FIG. 1 is a diagram of a system structure of an engine valve opening control apparatus for an internal combustion engine according to an embodiment of the present invention.

Embodiments of the present invention will be described with reference to the drawings.

In an intake pipe 102 of an internal combustion engine 101, an electronically controlled throttle 104 is disposed for driving a throttle valve 103b to open and close by a throttle motor 103a, and air is sucked into a combustion chamber 106 via electronically controlled throttle 104 and an intake valve 105.

A combusted exhaust gas discharged from combustion chamber 106 via an exhaust valve 107 is purified by a front catalyst 108 and a rear catalyst 109, and then emitted into the atmosphere.

Exhaust valve 107 is driven by a cam 111 axially supported by an exhaust side camshaft 110, to open and close at a fixed valve lift amount and valve operating angle (crank angle of from opening to closing). A valve lift amount and an operating angle, that is, an opening, of intake valve 105 are varied continuously by a variable valve lift mechanism (variable valve opening mechanism) 112. Note, the valve lift amount and the operating angle are varied simultaneously so that, when a characteristic of one of the valve lift amount and the operating angle is determined, a characteristic of the other is also determined.

On an intake side, a variable valve timing mechanism 201 constituted by a mechanism which continuously and variably controls a rotation phase difference between a crankshaft and an intake side camshaft, to advance or retard valve timing (valve opening/closing timing) of intake valve 105, and an intake side cam angle sensor 202 for detecting a rotation position of the intake side camshaft, are disposed on both end portions of the intake side camshaft.

A control unit 114 incorporating therein a microcomputer controls electronically controlled throttle 104 and variable valve lift mechanism 112, according to an accelerator pedal opening detected by an accelerator opening sensor APS 116 and the like, so that a target intake air amount corresponding to an accelerator opening ACC can be obtained based on an opening of throttle valve 103b and an opening characteristic of intake valve 105.

Control unit 114 receives various detection signals from an air flow meter 115 detecting an intake air amount Q of engine 101, a crank angle sensor 117 taking a rotation signal out of the crankshaft, a throttle sensor 118 detecting an opening TVO of throttle valve 103b, a water temperature sensor 119 detecting a cooling water temperature Tw of engine 101 and the like, in addition to accelerator opening sensor APS 116, a rotation angle sensor 127 (to be described later) and intake side cam angle sensor 202.

Further, an electromagnetic fuel injection valve 131 is disposed on an intake port 130 at the upstream side of intake valve 105 of each cylinder. Fuel injection valve 131 injects fuel adjusted at a predetermined pressure toward intake valve 105, when driven to open by an injection pulse signal from control unit 114.

Figure 2:
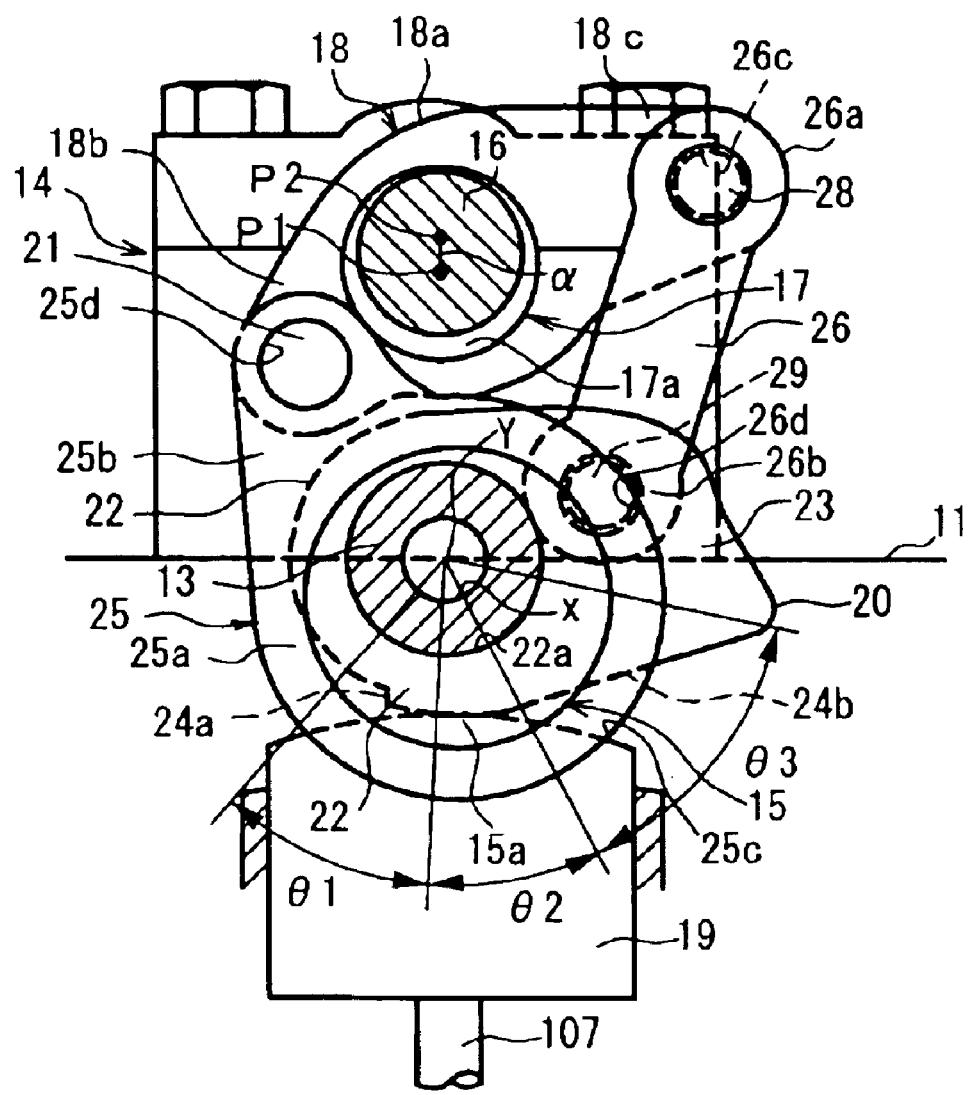
FIG. 2 is a cross section view showing a variable valve opening mechanism provided in the embodiment (A—A cross section view in FIG. 3).
Figure 3:
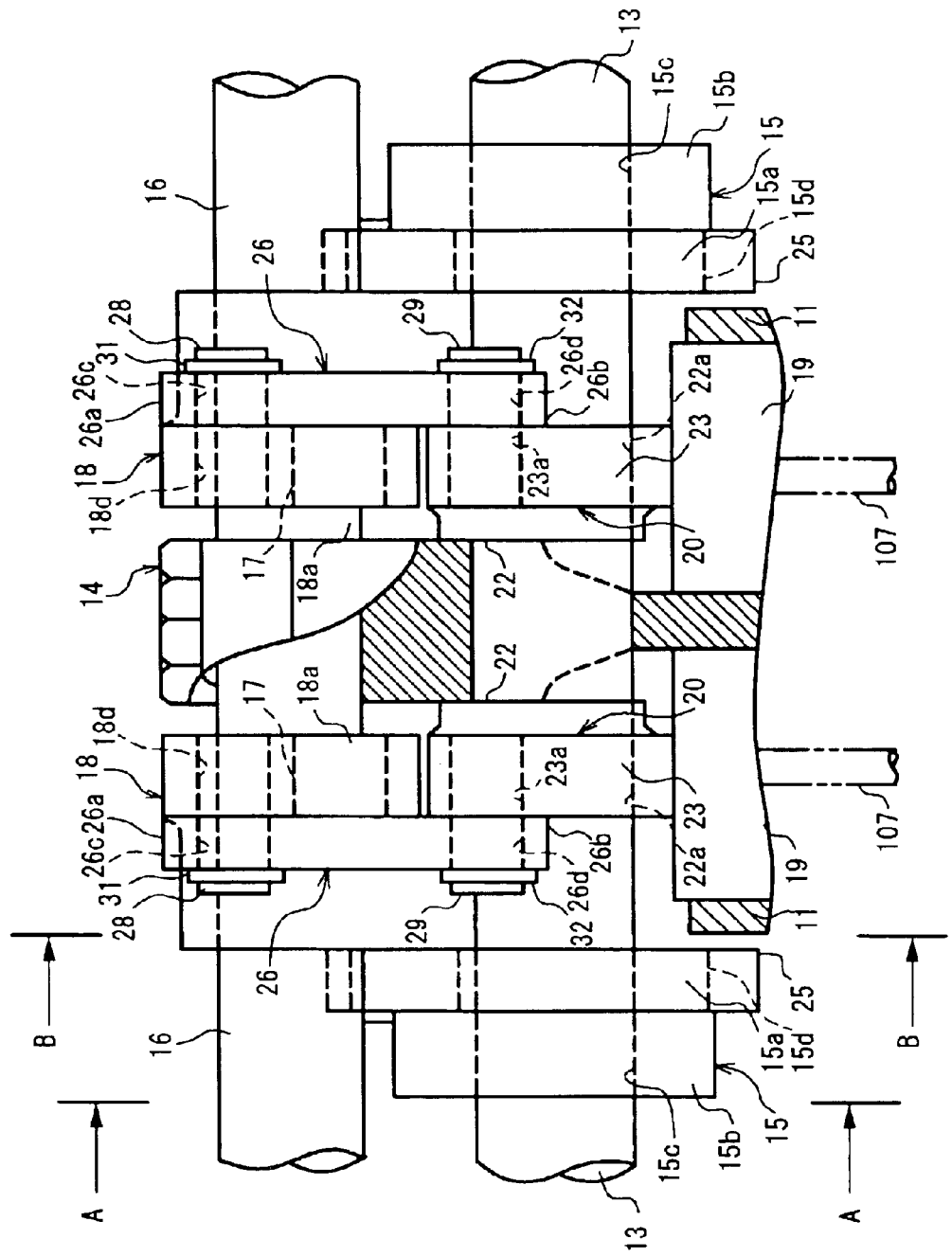
FIG. 3 is a side elevation view of the variable valve opening mechanism.
Figure 4:
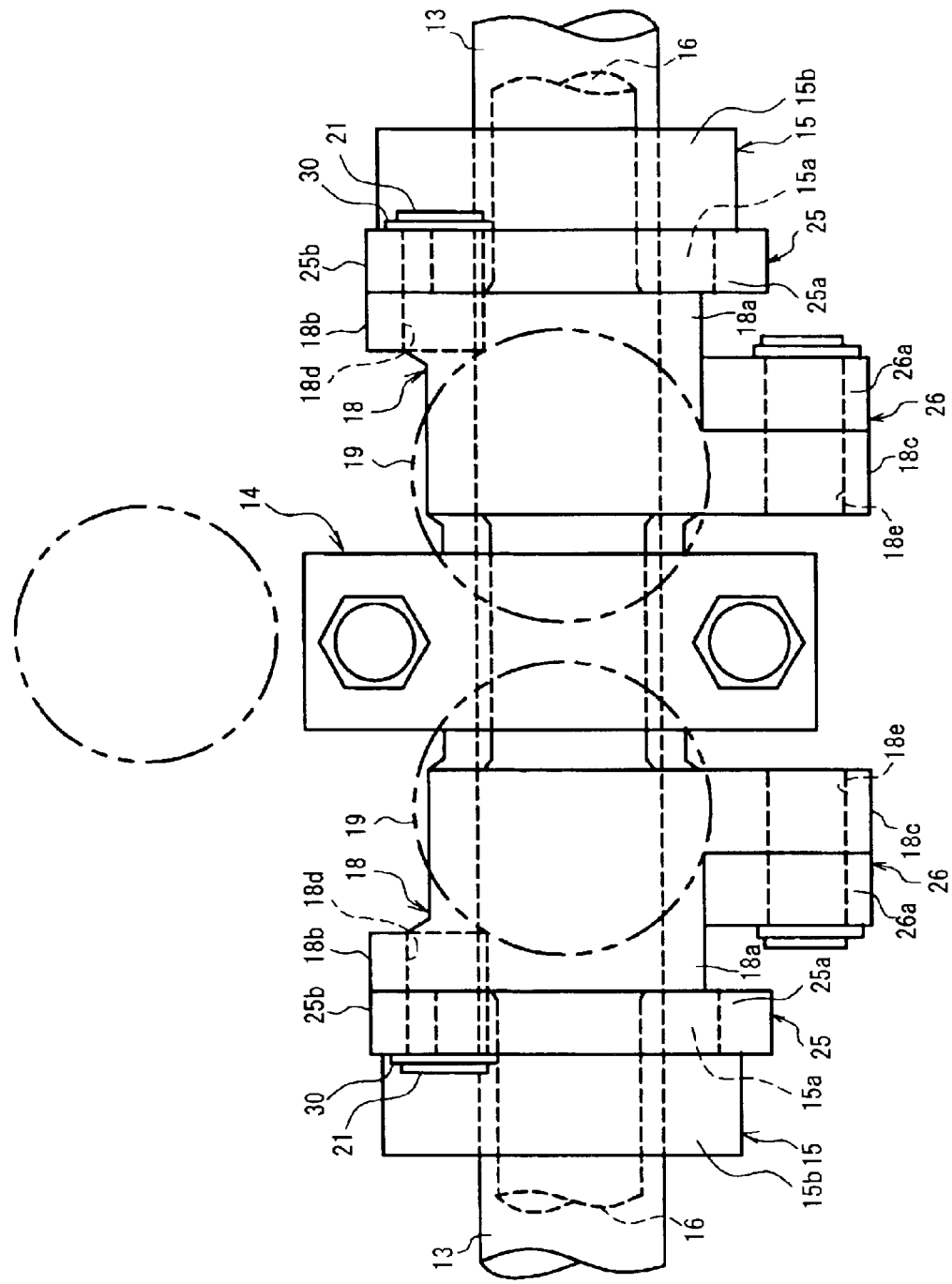
FIG. 4 is a top plan view of the variable valve opening mechanism.

FIG. 2 to FIG. 4 show in detail the structure of variable valve lift mechanism 112.

Variable valve lift mechanism 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of independent swing cams 20, 20 disposed on upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Rocker arms 18, 18, link arms 25, 25, and link members 26, 26 constitute a transmission mechanism.

Figure 5:
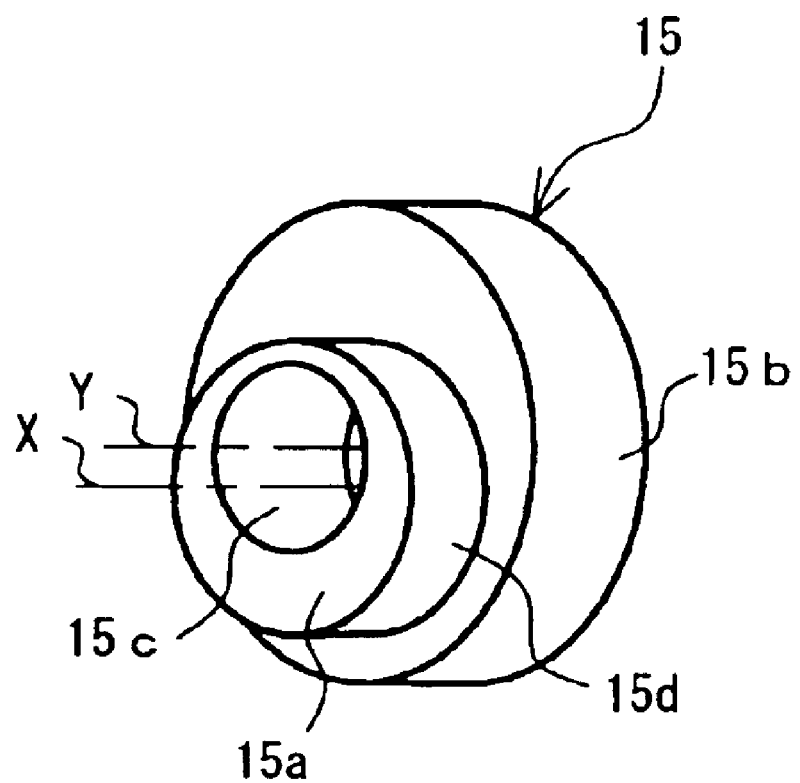
FIG. 5 is a perspective view showing an eccentric cam for use in the variable valve opening mechanism.

Each eccentric cam 15, as shown in FIG. 5, is formed in a substantially ring shape and includes a cam body 15a of small diameter, a flange portion 15b integrally formed on an outer surface of cam body 15a. An insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively, so as not to interfere with valve lifters 19, 19. Also, outer peripheral surfaces 15d, 15d of cam body 15a are formed in the same cam profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
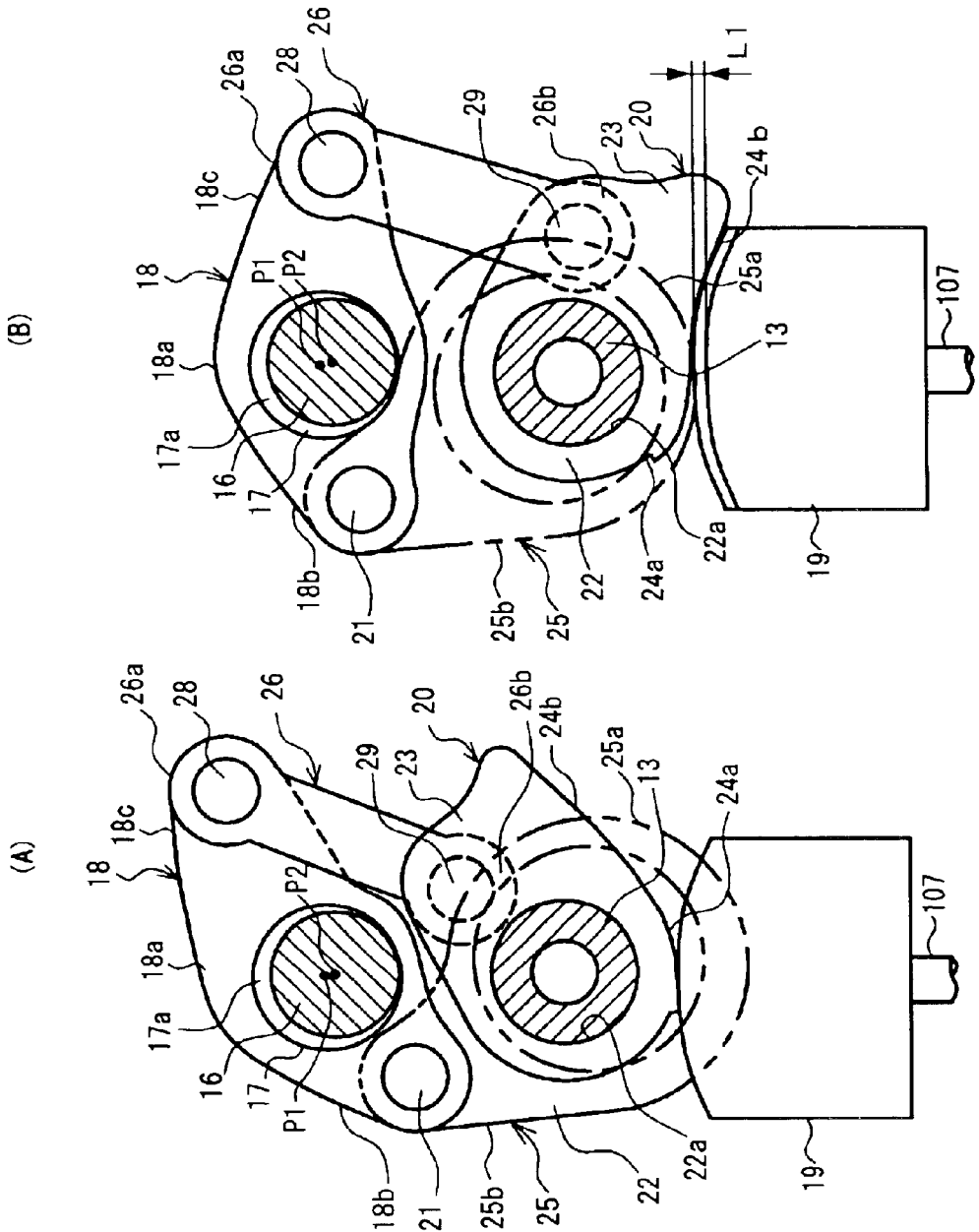
FIG. 6 is a cross section view showing an operation of the variable valve opening mechanism at a low lift condition (B—B cross section view of FIG. 3).
Figure 7:
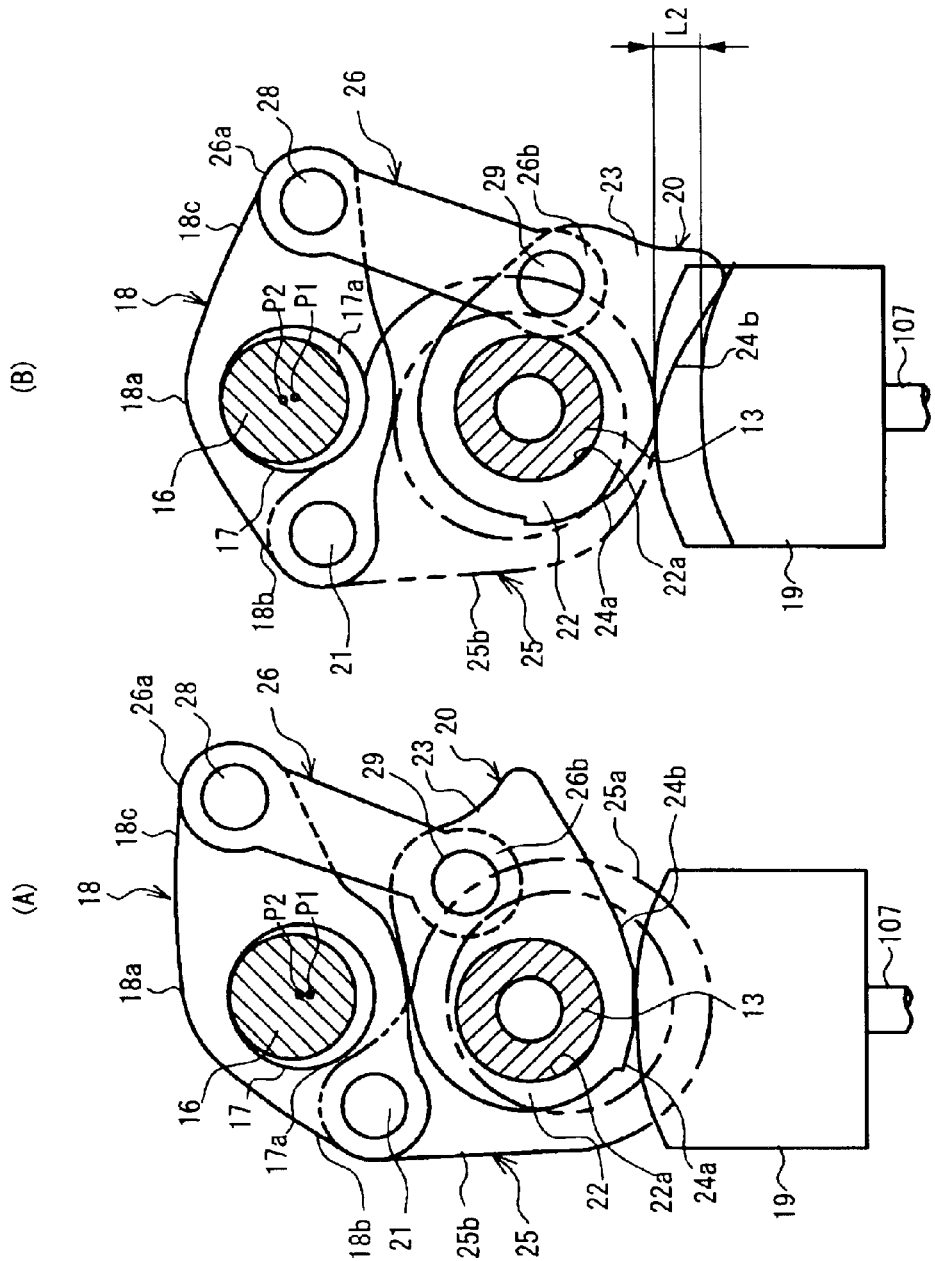
FIG. 7 is a cross section view showing an operation of the variable valve opening mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
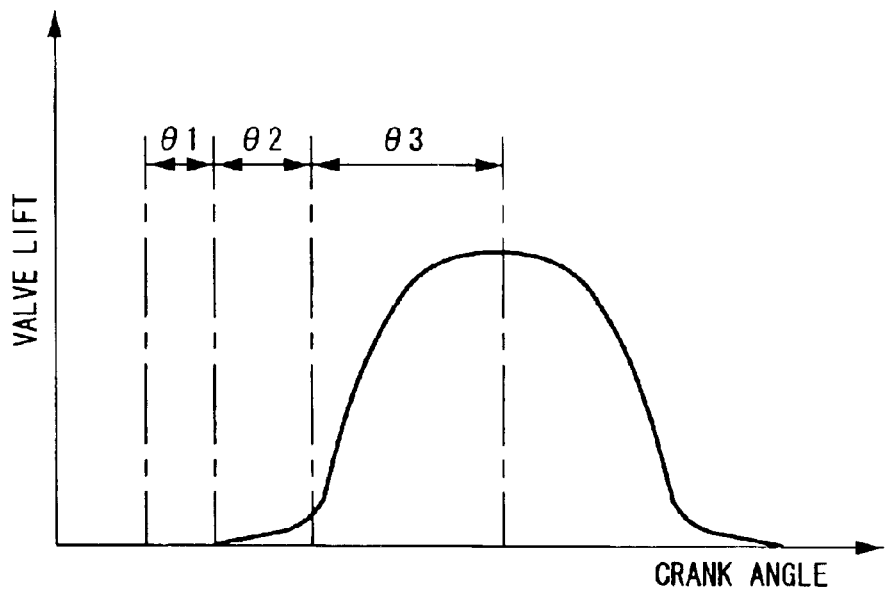
FIG. 8 is a valve lift characteristic diagram corresponding to a base end face and a cam surface of a swing cam in the variable valve opening mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 9:
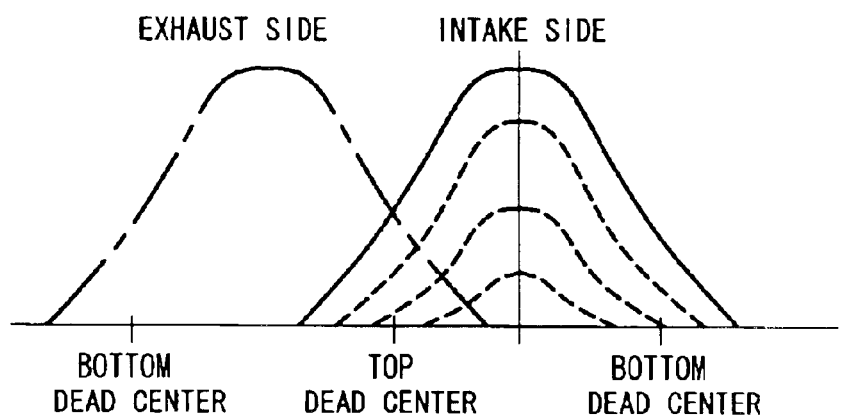
FIG. 9 is a characteristic diagram showing valve timing and a valve lift of the variable valve opening mechanism.
Figure 10:
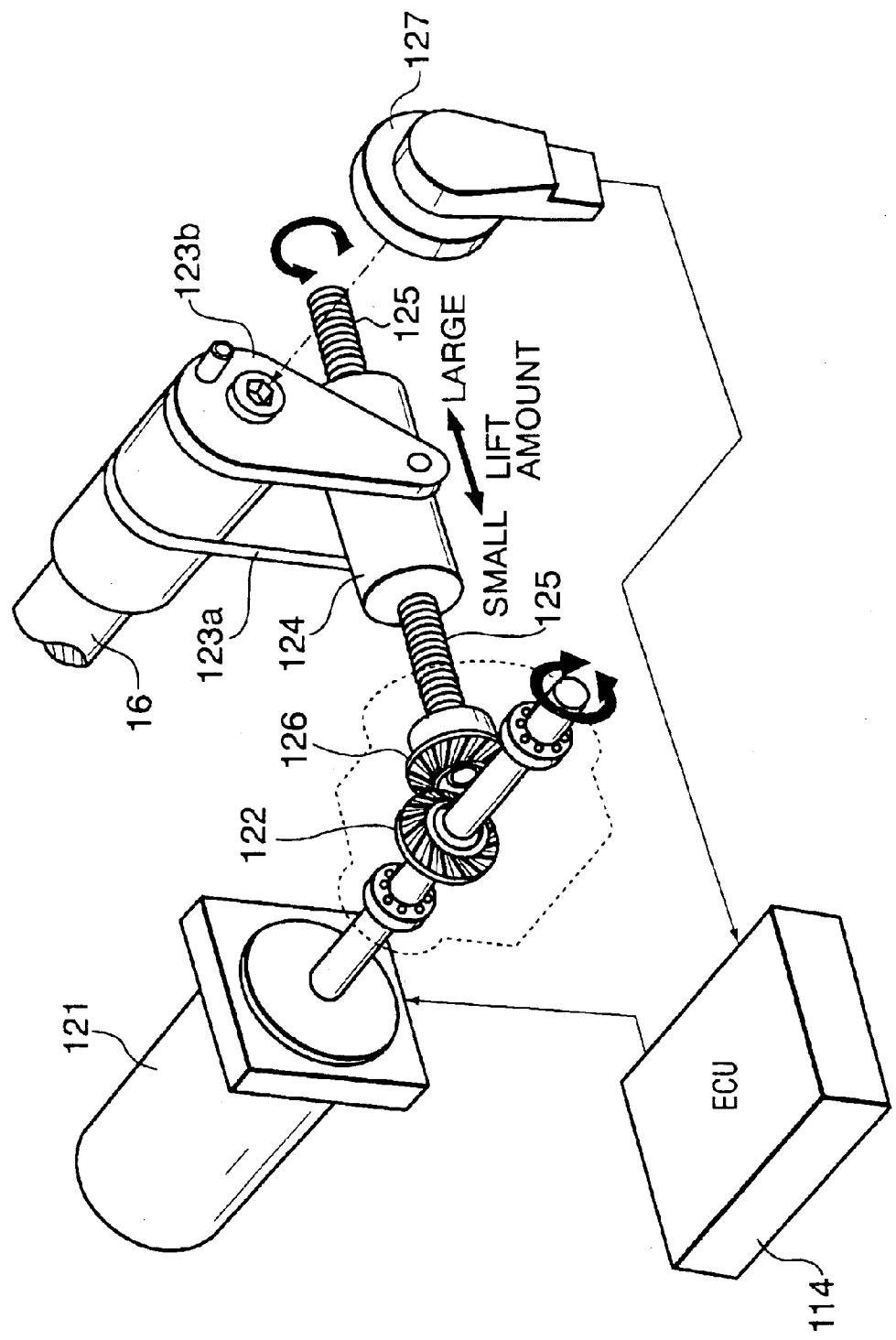
FIG. 10 is a perspective view showing a rotational driving mechanism of a control shaft in the variable valve opening mechanism.

Control shaft 16 is driven to rotate within a predetermined rotation angle range between a minimum angle position and a maximum angle position, which are restricted by stoppers, by a DC servo motor (actuator) 121 as shown in FIG. 10. By varying a rotation angle of control shaft 16 by actuator 121, the valve lift amount and valve operating angle of each of intake valves 105, 105 are continuously varied (refer to FIG. 9).

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip end of a threaded rod 125 engaged with nut 124. Threaded rod 125 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, potentiometer type rotation angle sensor 127 detecting the rotation angle of control shaft 16 is disposed on the tip end of control shaft 16, as shown in FIG. 10. Control unit 114 feedback controls DC servo motor 121 so that an actual rotation angle detected by rotation angle sensor 127 coincides with a target rotation angle. Here, since the lift amount and the operating angle are varied simultaneously by a rotation angle control of control shaft 16, rotation angle sensor 127 detects the operating angle and at the same time detects the lift amount, that is, an opening, of intake valve 105.

The opening (lift amount) of intake valve 105 is varied by such variable valve lift mechanism 112, so that the intake air amount is controlled. However, if variations are exhibited in detection accuracy of the intake valve 105 opening, which is detected through the detection of rotation angle of control shaft 16 by rotation angle sensor 127, the accuracy of intake air amount control is lowered. Therefore, in the present invention, a valve opening detection characteristic of rotation angle sensor 127 is learned as follows.

Figure 11:
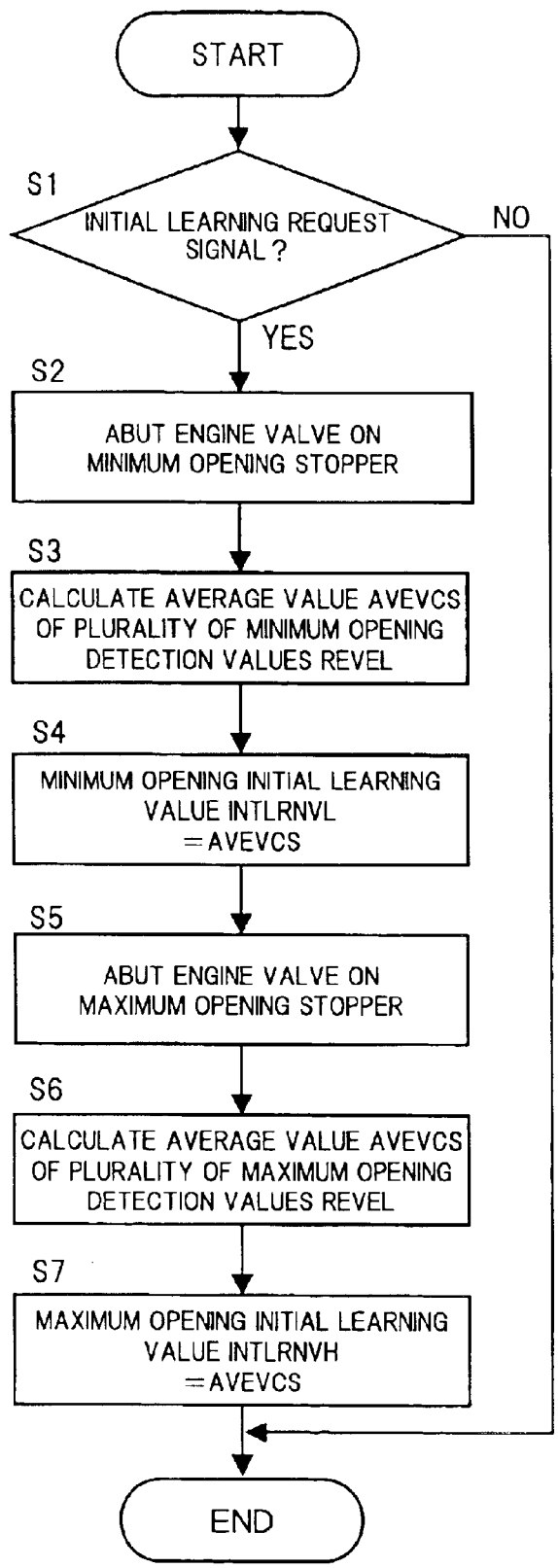
FIG. 11 is a flowchart showing an initial learning routine in the embodiment.

FIG. 11 shows a flowchart of an initial learning performed in the factory before shipment.

In step S1, it is judged whether or not an initial learning request signal is received from the outside, and when the initial learning request signal is received, control proceeds to step S2 and the subsequent steps, to perform the initial learning.

In step S2, control shaft 16 is forcibly driven to rotate by a drive apparatus independently provided, to be abutted on the stopper restricting control shaft 16 to the minimum rotation angle, to make the opening of intake valve 105 to be a minimum opening (minimum lift amount and also minimum operating angle). Thus, by using the independently provided drive apparatus before shipment, it is possible to learn the minimum opening as a first reference opening, which cannot be learned at the engine stop, for example, self-shutting off time and the like. Or, it may also be performed that, in the factory, the internal combustion engine is forcibly driven to drive variable valve opening mechanism 112, and a target opening is made to be the minimum opening so that control shaft 16 is abutted on the stopper.

In step S3, an actual opening at the time when intake valve 105 is made to be the minimum opening is detected by rotation angle sensor 127, to calculate an average value AVEVCS of a plurality of detection values REVEL. The plurality of detection values is obtained by performing the detection at each predetermined period of time under the state where control shaft 16 is abutted on the stopper (after a predetermined time has elapsed after control shaft 16 was driven). Further, the learning accuracy is enhanced, by using the average value of the plurality of detection values.

In step S4, the average value AVEVCS of the minimum opening is stored as an initial learning value INTLRNVL of the minimum opening.

In step S5, control shaft 16 is rotated to an opposite direction by the drive apparatus, to be abutted on the stopper restricting control shaft 16 to the maximum rotation angle, to make the opening of intake valve 105 to be a maximum opening (maximum lift amount and also maximum operating angle). Or, it may also be performed that, in the factory, the internal combustion engine is forcibly driven to drive variable valve opening mechanism 112, and the target opening is made to be the maximum opening so that control shaft 16 is abutted on the stopper.

In step S6, similar to the minimum opening learning, an actual opening at the time when intake valve 105 is made to be the maximum opening is detected, to calculate the average value AVEVCS of the plurality of detection values REVEL, and in step S7, the average value AVEVCS is made to be an initial learning value INTLRNVH of the maximum opening.

Figure 12:
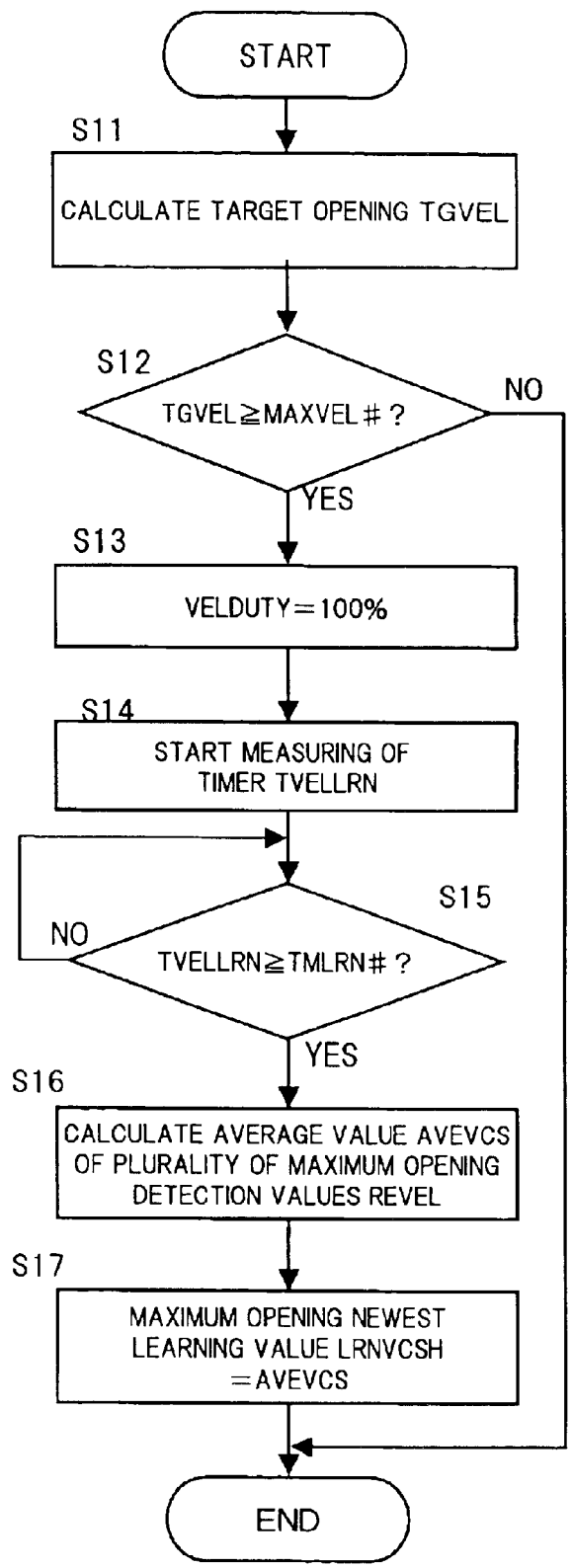
FIG. 12 is a flowchart showing a learning routine of maximum opening performed during vehicle running in the embodiment.

FIG. 12 shows a flowchart of, for example, the maximum opening learning as the learning of a second reference opening performed during vehicle running.

In step S11, a target opening TGVEL of intake valve 105 (target rotation angle of control shaft 16) during an engine operation is calculated.

In step S12, it is judged whether or not the target opening TGVEL is a set opening MAXVEL# or above closer to the maximum opening.

If it is judged in step S12 that TGVEL is less than MAXVEL#, the present routine is terminated. If it is judged that TGVEL is MAXVEL# or above, it is judged that there is no influence on the engine operation even if the maximum opening learning is performed, and control proceeds to step S13 and the subsequent steps, to perform the maximum opening learning. Note, instead of performing such a judgment, it may also be performed that the control is switched to a throttle control so as to obtain a target intake air amount equivalent to the target opening and at the same time the opening of the intake valve is made to be the maximum opening, thereby increasing learning opportunities of maximum opening.

In step S13, controlled variable of variable valve lift mechanism 112 for increasing the opening is made to be a maximum. To be specific, in the case where DC servo motor 121 is duty controlled, a driving duty value VELDUTY for increasing the opening is set to 100%.

In step S14, a timer is activated, and an elapsed time TVELLRN after starting the control is measured.

In step S15, it is judged whether or not the elapsed time TVELLRN reached a set value TMLRN#, and control proceeds to step S16 after the elapsed time TVELLRN reached the set value TMLRN#. The set value TMLRN# is set to a sufficient time during which control shaft 16 is abutted on the stopper to have the maximum rotation angle after starting the control.

In step S16, a plurality of actual openings is detected under the state where control shaft 16 is abutted on the stopper, and the average value AVEVCS of the detection values REVEL is calculated.

In step S17, the average value AVEVCS is updated to be stored as a newest learning value LRNVCSH of the maximum opening. Note, an initial value of the learning value LRNVCSH at the time when the maximum opening learning during vehicle running has never been performed, is set to 0.

Based on the results of minimum opening learning and maximum opening learning, the learning of detection characteristic of rotation angle sensor 127, that is, the learning of opening detection characteristic of intake valve 105, is performed during vehicle running.

Figure 13:
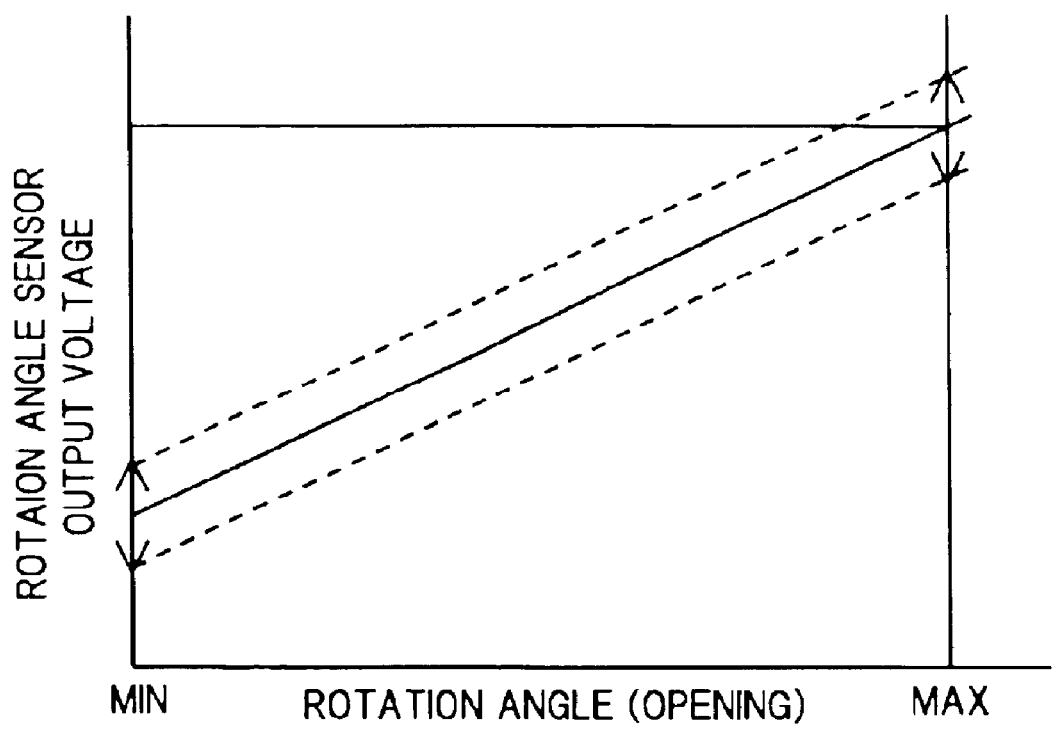
FIG. 13 is a graph showing a deterioration state of a rotation angle sensor having a large offset deterioration tendency.
Figure 14:
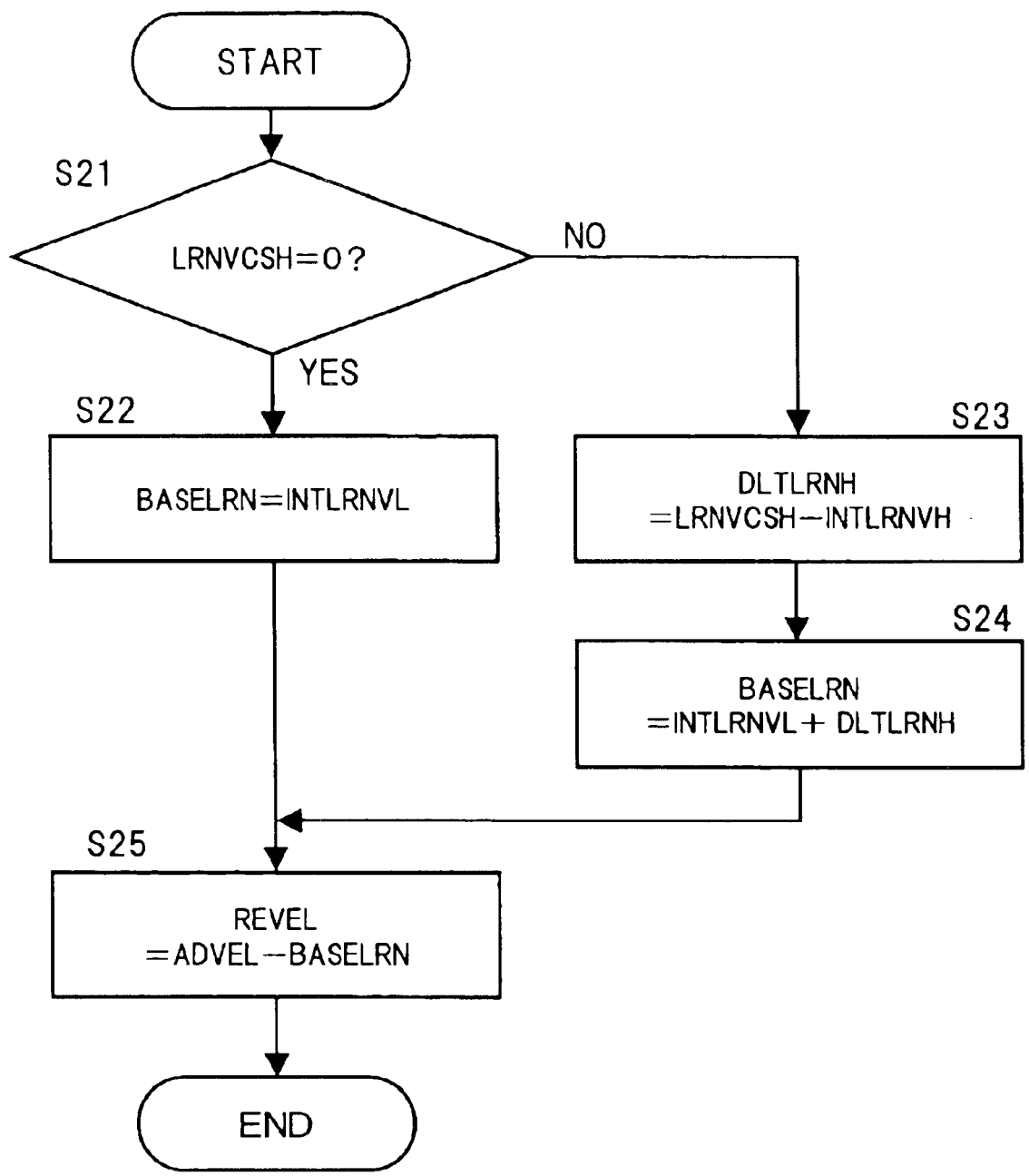
FIG. 14 is a flowchart showing a valve opening detection characteristic learning routine on the rotation angle sensor having the large offset deterioration tendency.
Figure 15:
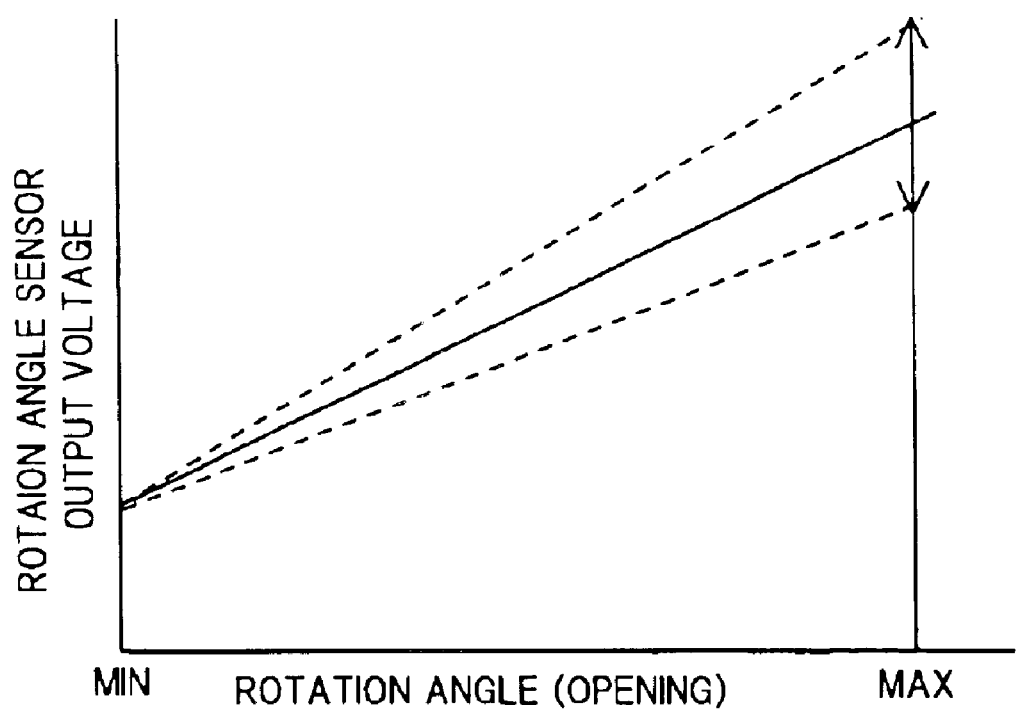
FIG. 15 is a graph showing a deterioration state of a rotation angle sensor having a large gain deterioration tendency.

Here, as shown in FIG. 13, when rotation angle sensor 127 has a large offset deterioration tendency in which an output value thereof to the actual opening over the entire opening region is offset by a fixed amount, the opening detection characteristic is learned in accordance with a flowchart of FIG. 14.

In step S21, it is judged whether or not the newest learning value LRNVCSH of the maximum opening is 0. When it is 0, that is, when the maximum opening learning during vehicle running has never been performed, control proceeds to step S22, where the initial learning value INTLRNVL of the minimum opening obtained in the factory before shipment is set just as it is, as a minimum opening learning value BASELRN to be finally used in an opening detection characteristic equation described below.

On the other hand, when it is judged in step S21 that the learning value LRNVCSH is not 0, that is, when it is judged that the maximum opening learning during vehicle running has been performed, control proceeds to step S23, where a deviation DLTLRN between the learning value LRNVCSH of the maximum opening during vehicle running and the initial learning value INTLRNVH is calculated according to the following equation.

$$DLTLRN = LRNVCSH - INTLRNVH$$

Then, in step S24, a value obtained by correcting the sum of the minimum opening initial learning value INTLRNVL and the deviation DLTLRN is set as the minimum opening learning value BASELRN.

$$BASELRN = INTLRNVL + DLTLRN$$

In step S25, using the minimum opening learning value BASELRN set in either step S22 or step S24, the opening detection characteristic equation is learned as in the following equation.

$$REVEL = ADVEL - BASELRN$$

Here, ADVEL is a basic opening, which is obtained by converting a sensor output (AD conversion value of voltage) into the opening.

Namely, until the maximum opening learning during vehicle running is performed, the opening detection characteristic is determined based on the minimum opening initial learning value INTLRNVL obtained in the factory before shipment, and after the maximum opening learning during vehicle running is performed, it is judged that the deviation DLTLRN between the maximum opening newest learning value and the initial learning value occurs as an offset due to the deterioration (offset deterioration). The minimum opening initial learning value INTLRNVL is corrected with this deviation, and the opening detection characteristic is corrected based on the corrected learning value BASELRN. Note, when the maximum opening newest learning value LRNVCSH equals to the initial learning value INTLRNVH, since there does not occur a deviation due to the deterioration, the opening detection characteristic initially determined is maintained (this is similar to an embodiment for the gain deterioration).

Thus, the minimum opening learning which is hardly to be executed during vehicle running and at the time of engine stop, can be performed in the factory before shipment, and the offset occurring due to the deterioration thereafter, can be corrected based on the learning result of maximum opening during vehicle running. As a result, it is possible to always maintain the accurate opening detection characteristic while ensuring learning opportunities, and further to keep with high accuracy the opening control and further intake amount control of intake valve 105.

Figure 16:
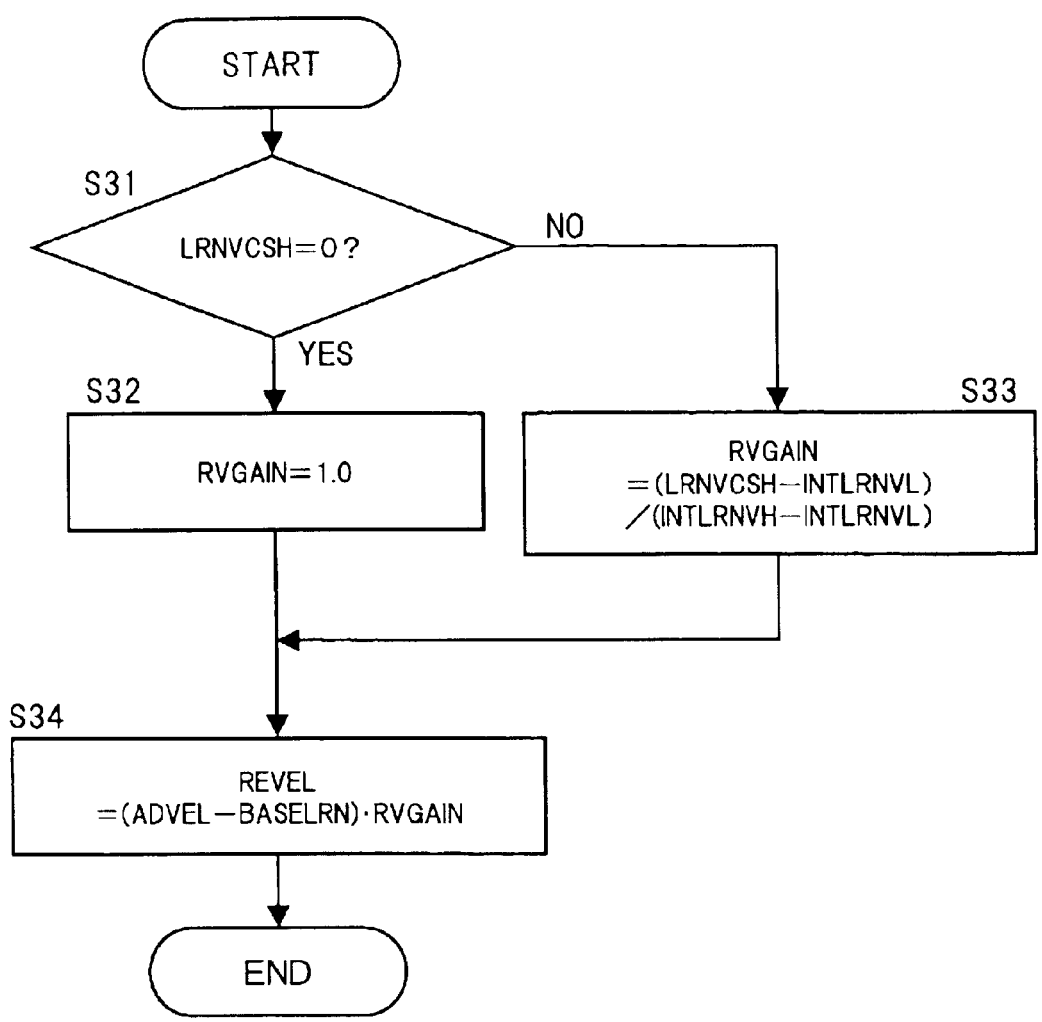
FIG. 16 is a flowchart showing a valve opening detection characteristic learning routine on the rotation angle sensor having the large gain deterioration tendency.

On the other hand, when rotation angle sensor 127 has a large gain deterioration tendency in which an inclination of output value change to an actual opening change is offset due to the deterioration, the opening detection characteristic is learned in accordance with a flowchart of FIG. 16.

In step 31, it is judged whether or not the maximum opening newest learning value LRNVCSH is 0, and when it is 0, that is, when the maximum opening learning during vehicle running has never been performed, control proceeds to step S32, where a gain learning value RVGAIN in the opening detection characteristic equation described below is set to an initial value 1.0.

On the other hand, when it is judged in step S31 that the learning value LRNVCSH is not 0, that is, when it is judged that the maximum opening learning during vehicle running has been performed, control proceeds to step S33, where the gain learning value RVGAIN is calculated in accordance with the following equation, based on the minimum opening initial learning value INTLRNVL and the maximum opening initial learning value INTLRNVH.

$$RVGAIN = (LRNWCSH - INTLRNVL)/(INTLRNVH - INTLRNVL)$$

Then, in step S34, using the gain learning value RVGAIN obtained in either step S32 or step S33, the opening detection characteristic equation is learned as in the following equation.

$$REVEL = (ADVEL - BASELRN) \cdot RVGAIN$$

Note, the minimum opening learning value BASELRN= initial learning value INTLRNVL.

Namely, until the maximum opening learning during vehicle running is performed, the opening detection characteristic is determined based on the initial gain learning value RVGAIN, and after the maximum opening learning during vehicle running is performed, the gain learning value RVGAIN is corrected using the maximum opening newest learning value LRNVCSH and the minimum opening initial learning value INTLRNVL. As a result, it is possible to always maintain the accurate opening detection characteristic while ensuring learning opportunities, and also to keep with high accuracy the opening control and further intake air amount control of intake valve 105.

Note, the initial learning in the factory before shipment may be the learning of either the minimum opening or the maximum opening. For example, in a system where there is a gap of certain degrees in the minimum lift condition during the engine operation and accordingly the air can be sucked into the cylinder, the construction may be such that at least the maximum opening side is initially learned, and after the engine operation, the minimum lift learning is performed.

Further, as in the embodiments described above, the learning of the first and second reference openings is performed in the states of minimum opening and maximum opening where control shaft 16 is abutted on the stopper. Therefore, it is possible to easily control intake valve 105 to the mechanically stopped opening position, and also to perform the learning with accuracy at a stable opening.

The entire contents of Japanese Patent Application No. 2003-182784 filed on Jun. 26, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. An apparatus for controlling an engine valve opening in an internal combustion engine, comprising:
   a variable valve opening mechanism which varies an opening of an engine valve continuously;
   an opening sensor detecting the opening of the engine valve; and
   a control unit that sets a target opening of the engine valve, and based on the detection value of said opening of the engine valve, feedback controls the opening of the engine valve to said target opening,
   wherein said control unit;
   detects to learn the opening of the engine valve to controlled variable of a first reference opening at an initial time, and after the initial learning, detects to learn the opening of the engine valve to controlled variable of a second reference opening different from said first reference opening, and based on said initial learning result and a newest learning result of the second reference opening, learns an opening detection characteristic of said opening sensor.

2. An apparatus for controlling an engine valve opening in an internal combustion engine according to claim 1,
   wherein said control unit;
   when an output characteristic of said opening sensor has a tendency in which an output value thereof to an actual opening is offset by a fixed amount over the entire opening region due to the deterioration, corrects the initial learning result of said first reference opening according to the newest learning result of said second reference opening, and based on said corrected learning result of the first reference opening and the newest learning result of the second reference opening, learns the opening detection characteristic.

3. An apparatus for controlling an engine valve opening in an internal combustion engine according to claim 1,
   wherein said control unit;
   when an output characteristic of said opening sensor has a tendency in which an inclination of an output value change to an actual opening change is offset due to the deterioration, learns the opening detection characteristic based on said initial learning result of the first reference opening and the newest learning result of said second reference opening.

4. An apparatus for controlling an engine valve opening in an internal combustion engine according to claim 1,
   wherein said control unit;
   learns a small reference opening as said first reference opening, and a large reference opening as said second reference opening.

5. An apparatus for controlling an engine valve opening in an internal combustion engine according to claim 1,
   wherein said control unit;
   receives an initial learning request signal from the outside to perform said initial learning of reference opening.

6. An apparatus for controlling an engine valve opening in an internal combustion engine according to claim 1,
   wherein said control unit;
   learns a minimum opening as said first reference opening, at an initial time.

7. An apparatus for controlling an engine valve opening in an internal combustion engine according to claim 1,
   wherein said variable valve opening mechanism comprises stoppers mechanically restricting an opening range of the engine valve, and
   said control unit;
   performs the learning of said first and second reference openings in states of a minimum opening and a maximum opening where the engine valve is abutted on said stoppers to be stopped.

8. An apparatus for controlling an engine valve opening in an internal combustion engine according to claim 1,
   wherein said variable valve opening mechanism comprises a stopper mechanically restricting an opening range of the engine valve, and
   when said control unit performs said initial learning, said initial learning is performed in a state where said variable valve opening mechanism is forcibly driven by a drive apparatus provided on the outside of said internal combustion engine, to abut said engine valve on said stopper.

9. An apparatus for controlling an engine valve opening in an internal combustion engine according to claim 1,
   wherein said control unit;
   performs the learning of said second reference opening, which is performed after said initial learning, by forcibly controlling said engine valve to have a maximum opening by said variable valve opening mechanism during an engine operation.

10. An apparatus for controlling an engine valve opening in an internal combustion engine according to claim 9,
    wherein said internal combustion engine comprises an electronically controlled throttle in an intake system, and when an opening characteristic of an opening sensor for an intake valve is learned, said control unit performs the learning of said second reference opening, which is performed after said initial learning, by forcibly controlling said intake valve to have a maximum opening by said variable valve opening mechanism during the engine operation, while controlling an intake air amount by said electronically controlled throttle.

11. An apparatus for controlling an engine valve opening in an internal combustion engine according to claim 1,
wherein said control unit;
detects to learn the openings of said engine valve relative to controlled variable of said first and second reference openings, at an initial time.

12. An apparatus for controlling an engine valve opening in an internal combustion engine according to claim 1,
wherein said variable valve opening mechanism is for varying a valve lift amount together with a valve operating angle of said engine valve, to vary the opening of said engine valve.

13. An apparatus for controlling an engine valve opening in an internal combustion engine according to claim 12,
wherein said variable valve opening mechanism comprises:
a drive shaft rotating in synchronism with a crankshaft;
a drive cam fixed to said drive shaft;
a swing cam swinging to operate said valve to open and close;
a transmission mechanism with one end connected to said drive cam side and the other end connected to said swing cam side;
a control shaft having a control cam changing the position of said transmission mechanism; and
an actuator rotating said control shaft, and
continuously varies the valve lift amount together with the valve operating angle of the engine valve by rotatably controlling said control shaft by said actuator.

14. An apparatus for controlling an engine valve opening in an internal combustion engine, comprising:
a variable valve opening mechanism which varies an opening of an engine valve continuously;
an opening sensor detecting the opening of the engine valve;
control means for setting a target opening of the engine valve, and based on the detection value of said opening of the engine valve, feedback controlling the opening of the engine valve to said target opening;
initial learning means for detecting to learn at least the opening of the engine valve to controlled variable of a first reference opening at an initial time; and
latter stage learning means for detecting to learn the opening of the engine valve to controlled variable of a second reference opening different from said first reference opening, and based on said initial learning result and a newest learning result of the second reference opening, learning an opening detection characteristic of said opening sensor, after said initial learning.

15. A method for controlling an engine valve opening in an internal combustion engine equipped with a variable valve opening mechanism which varies an opening of an engine valve continuously, comprising the steps of:
detecting the opening of the engine valve;
setting a target opening of the engine valve, and based on the detection value of said opening of the engine valve, feedback controlling the opening of the engine valve to said target opening;
detecting to learn the opening of the engine valve to controlled variable of a first reference opening at an initial time;
detecting to learn the opening of the engine valve to controlled variable of a second reference opening different from said first reference opening, after said initial learning; and
learning an opening detection characteristic of said opening sensor, based on said initial learning result and a newest learning result of the second reference opening.

16. A method for controlling an engine valve opening in an internal combustion engine according to claim 15,
wherein said step of learning the opening detection characteristic of said opening sensor, based on said initial learning result and the newest learning result of the second reference opening;
corrects the initial learning result of said first reference opening according to the newest learning result of said second reference opening, and based on said corrected learning result of the first reference opening and the newest learning result of the second reference opening, learns the opening detection characteristic, when an output characteristic of said opening sensor has a tendency in which an output value thereof to an actual opening is offset by a fixed amount over the entire opening region due to the deterioration.

17. A method for controlling an engine valve opening in an internal combustion engine according to claim 15,
wherein said step of learning the opening detection characteristic of said opening sensor, based on said initial learning result and the newest learning result of the second reference opening;
learns the opening detection characteristic based on said initial learning result of the first reference opening and the newest learning result of said second reference opening, when an output characteristic of said opening sensor has a tendency in which an inclination of an output value change to an actual opening change is offset due to the deterioration.

18. A method for controlling an engine valve opening in an internal combustion engine according to claim 15,
wherein said step of detecting to learn at least the opening of the engine valve to the controlled variable of the first reference opening at the initial time;
learns a small reference opening as said first reference opening; and
said step of detecting to learn the opening of the engine valve to the controlled variable of the second reference opening different from said first reference opening, after said initial learning;
learns a large reference opening as said second reference opening.

19. A method for controlling an engine valve opening in an internal combustion engine according to claim 15,
wherein said step of detecting to learn at least the opening of the engine valve to the controlled variable of the first reference opening at the initial time;
receives an initial learning request signal from the outside to perform said initial learning of reference opening.

20. A method for controlling an engine valve opening in an internal combustion engine according to claim 15,
wherein said step of detecting to learn at least the opening of the engine valve to the controlled variable of the first reference opening at the initial time;

learns a minimum opening as said first reference opening, at an initial time.

21. A method for controlling an engine valve opening in an internal combustion engine according to claim 15, wherein said variable valve opening mechanism comprises stoppers mechanically restricting an opening range of the engine valve;

said step of detecting to learn the opening of the engine valve to the controlled variable of the first reference opening at the initial time, performs the learning of said first reference opening in a state of minimum opening where the engine valve is abutted on said stopper to be stopped, and said step of detecting to learn the opening of the engine valve to controlled variable of the second reference opening different from said first reference opening, after said initial learning;

performs the learning of second reference opening in a state of maximum opening where the engine valve is abutted on said stopper to be stopped.

22. A method for controlling an engine valve opening in an internal combustion engine according to claim 15, wherein said variable valve opening mechanism comprises a stopper mechanically restricting an opening range of the engine valve, and said step of performing the initial learning;

performs the learning in a state where said variable valve opening mechanism is forcibly driven by a drive apparatus provided on the outside of said internal combustion engine, to abut said engine valve on said stopper.

23. A method for controlling an engine valve opening in an internal combustion engine according to claim 15, wherein said step of performing the learning of said second reference opening, after said initial learning;

performs the learning of said second reference opening by forcibly controlling said engine valve to have a maximum opening by said variable valve opening mechanism during an engine operation.

24. A method for controlling an engine valve opening in an internal combustion engine according to claim 23, wherein said internal combustion engine comprises an electronically controlled throttle in an intake system, and said step of performing the learning of said second reference opening, after said initial learning;

performs the learning of said second reference opening by forcibly controlling said intake valve to have a maximum opening by said variable valve opening mechanism during the engine operation, while controlling an intake air amount by said electronically controlled throttle.

25. A method for controlling an engine valve opening in an internal combustion engine according to claim 15, wherein said step of performing the initial learning;

detects to learn the openings of said engine valve relative to controlled variable of said first and second reference openings.

* * * * *